United States Patent [19]

Tominaga

[11] Patent Number: 5,039,385
[45] Date of Patent: Aug. 13, 1991

[54] NOVEL METHOD OF ELECTRODEPOSITION COATING

[75] Inventor: Akira Tominaga, Chigasaki, Japan

[73] Assignee: Kansai Paint Co., Ltd., Hyogo, Japan

[21] Appl. No.: 497,737

[22] Filed: Mar. 19, 1990

Related U.S. Application Data

[63] Continuation-in-part of Ser. No. 157,266, Feb. 18, 1988, abandoned.

[30] Foreign Application Priority Data

Feb. 28, 1987 [JP] Japan .................................. 62-44055

[51] Int. Cl.⁵ .............................................. C25D 13/00
[52] U.S. Cl. ................................ 204/181.7; 204/181.6; 523/425
[58] Field of Search ......................... 204/181.6, 181.7; 523/425

[56] References Cited

U.S. PATENT DOCUMENTS

| | | | |
|---|---|---|---|
| 3,868,342 | 2/1975 | Magne | 523/425 |
| 4,046,729 | 9/1977 | Scriven | 204/181.7 |
| 4,147,679 | 4/1979 | Saiver | 204/181.7 |
| 4,330,446 | 5/1982 | Miyosawa . | |

OTHER PUBLICATIONS

Database WPIL, No. 75-09711, Derwent Publication Ltd., London, GB; & JP-A-49 057 033 (Toa Gosei Chem. Ind. Co.) 03-06-1974 *Abstract*.

Derwent Accession No. 89-131347, Derwent Publications Ltd., London Abstract of Japanese No. A-5-9-067379.

Derwent Accession No. 79-30328B, Derwent Publications Ltd., London Abstract of Japanese No. A-5-4-031279.

Derwent Accession No. 86-255277, Derwent Publications Ltd., London Abstract of Japanese No. A-6-1-182940.

*Primary Examiner*—John F. Niebling
*Assistant Examiner*—David G. Ryser
*Attorney, Agent, or Firm*—Wenderoth, Lind & Ponack

[57] ABSTRACT

A method of electrodeposition coating which permits low-temperature curing and comprises electrodepositing a water-base electrodeposition coating composition comprising an ionic group-containing resin and a crosslinking agent as vehicles on an article to be coated and then heating the coated article to form a cured coated film, wherein the ionic group-containing resin contains a hydroxyl group and the crosslinking agent contains at least two alkoxysilane groups and optionally hydroxysilane groups per molecule, and said resin can be cured by condensation reaction between said functional groups and the hydroxyl groups.

14 Claims, No Drawings

NOVEL METHOD OF ELECTRODEPOSITION COATING

This application is a continuation-in-part of now abandoned application, Ser. No. 07/157,266 filed on Feb. 18, 1988.

BACKGROUND OF THE INVENTION

1. Field of the Invention

This invention relates to a novel method of electrodeposition coating, particularly a method of electrodeposition coating which permits low-temperature curing, and to a water-base paint resin composition which can be used advantageously in the above method.

2. Description of the Prior Art

Previously proposed methods of electrodeposition coating which form coated films capable of being cured at low temperatures of about 120° to 140° C. include, for example, those in which resins containing both a cationic group and a blocked isocyanate functional group capable of being dissociated at low temperatures are used (U.S. Pat. Nos. 3,984,299 and 4,435,559), and those in which resins containing both a cationic group and an N-methylol functional group are used (U.S. Pat. Nos. 4,341,676 and 4,501,833). Coated films formed by low-temperature curing in these methods are insufficient in adhesiveness and corrosion resistance.

It is an object of this invention to provide an electrodeposition coating method which gives excellent low-temperature curability, bath stability, surface smoothness and film properties (adhesion, corrosion resistance, etc.) by using an electrodeposition paint comprising a resin containing both an ionic group and a hydroxyl group, and a crosslinking agent containing alkoxysilane groups and optionally, hydroxysilane groups, which is of quite a different type from the vehicles previously used, as a film-forming vehicle.

Attempts have been made previously to improve the adhesion, weatherability and corrosion resistance of electrodeposited coated films by using a compound containing a hydroxysilane or an alkoxysilane group as a pre-treating agent (see, for example, U.S. Pat. Nos. 3,785,946 and 4,330,446). It is well known in the field of moisture-curable paints to utilize the condensation reaction of the hydroxysilane group and/or the alkoxysilane group for curing of coated films (for example, Japanese Laid-Open Patent Publications Nos. 73998/1977 and 40893/1979). As another use of an aqueous dispersion of the resin containing a hydroxysilane group and/or an alkoxysilane group, it was proposed to utilize a resin obtained by copolymerizing a vinyl or acrylic monomer containing the aforesaid functional group as a comonomer component for surface-treating inorganic building materials (Japanese Laid-Open Patent Publication No. 57860/1981).

An aqueous dispersion of such a resin containing a hydroxysilane group and/or an alkoxysilane group as a functional group was not previously thought to exist stably in a non-gelled state because of the high reactivity of the functional group. Hence, no attempt has been made to apply it to the field of electrodeposition coating. However, surprisingly in view of the prior thought, the present inventor has found that a crosslinking agent containing the above functional group and a resin containing both an ionic group and a hydroxyl group exists stably without gellation in their aqueous co-dispersion and this aqueous co-dispersion is useful for electrodeposition coating, and that when an electrodeposited film from an electrodeposition coating bath comprising this aqueous co-dispersion is heated after deposition, condensation reaction proceeds with the evaporation of water and the melting of the film whereby the film is crosslinked to form a uniform coated film excellent in film properties such as adhesion, weatherability and corrosion resistance. This discovery has led to the accomplishment of the present invention.

SUMMARY OF THE INVENTION

Thus, according to this invention, there is provided a method of electrodeposition coating which comprises electrodepositing a water-base electrodeposition coating composition comprising an ionic group-containing resin and a crosslinking agent as vehicles on an article to be coated and then heating the coated article to form a cured coated film, wherein the ionic group-containing resin contains a hydroxyl group and the crosslinking agent contains at least two alkoxysilane groups and optionally hydroxysilane groups per molecule, and said resin can be cured by condensation reaction between said functional groups and the hydroxyl groups.

The present invention also provides, as a novel coating composition which can be conveniently used in the above method, a water-base coating composition comprising a resin containing a cationic group and a hydroxyl group and a crosslinking agent containing at least two alkoxysilane groups and optionally hydroxysilane groups per molecule.

DETAILED DESCRIPTION OF THE INVENTION

The "hydroxysilane group" or "alkoxysilane group", as used in this specification is an organosilicon radical having at least one hydroxyl group or alkoxy group bonded to the silicon atom, and typically includes functional groups represented by the following general formula

or

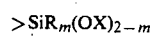

wherein R represents a hydrocarbon group such as an alkyl group having 1 to 6 carbon atoms or a phenyl group, X represents a hydrogen atom or an organic group to be described below, n represents 0 or an integer of 1 or 2, and m represents 0 or 1.

The resin containing both an ionic group and a hydroxyl group and the crosslinking agent containing alkoxysilane groups and optionally hydroxysilane groups used as a vehicles component of the water-base electrodeposition coating composition used in this invention may be formed into a non-gelled aqueous dispersion by preparing a non-aqueous solution of the vehicle component with or without a catalyst, and emulsifying it without keeping the non-aqueous solution in the non-emulsified state in contact with water for a long period of time. This non-gelled aqueous dispersion can be used in the electrodeposition coating method of this invention as a water-base electrodeposition coating bath.

The emulsified aqueous dispersion of the above vehicle component can be prepared, for example, by the following methods.

(1) The non-aqueous solution of the vehicle component, or a mixture of the vehicle component with a neutralizing agent, is agitated by means of a disper, and during agitation, water is put into it within a short period of time to emulsify and dilute it.

(2) With agitation by means of a disper, the non-aqueous solution of the vehicle component is gradually put into water or a mixture of water and a neutralizing agent (acid) to emulsify it (suitable for small-scale production).

(3) The non-aqueous solution of the vehicle component or a mixture of it with a neutralizing agent and water are simultaneously fed into a pipeline mixer to emulsify it continuously (suitable for mass-production).

During emulsification and dispersion in water, at least part of the alkoxysilane groups will be hydrolyzed to hydroxysilane groups and oriented on the surface of the particles as hydrophilic groups. It is presumed that since the degree of dilution with water is high, electrostatic repulsion among the emulsion particles or hydrogen bonding to an alcohol solvent makes it possible to maintain the resulting aqueous dispersion of the resin stable without gellation. The aqueous dispersion becomes more stable in cathodic electrodeposition since the pH of the electrodeposition bath corresponds to a stable region of 4 to 7.

When a film electrodeposited from an aqueous electrodeposition coating bath comprising the so prepared aqueous dispersion is heated, water is volatilized and the resin is melted. Consequently, dehydration reaction or alcohol-eliminating condensation reaction takes place between hydroxysilane and/or alkoxysilane groups and hydroxyl groups, etc. to crosslink and cure the coated film. To promote these reactions, it is possible, if required, to add organic metal compounds, for example carboxylates and chelate compounds of metals such as Al, Ti, V, Cr, Mn, Fe, Co, Ni, Cu, Zn, Zr, Sn, Pb and Bi as a catalyst to the vehicle component in the preparation of the aqueous dispersion of the vehicle component. Organic metal compounds of Ti, Fe, and Pb are especially effective as a reaction catalyst.

The reaction of crosslinking the electrodeposited film can be promoted by adding acetylacetone to the vehicle component instead of the above catalyst. Acetylacetone forms a chelate with the metal dissolved from the article to be coated, and this chelate acts as a catalyst. The amount of acetylacetone used is 5 to 100 parts by weight, preferably 10 to 50 parts by weight, per 100 parts by weight of the resin solids in the aqueous dispersion.

The type of the ionic group in the ionic group-containing resin as a vehicle component for the water-base electrodeposition paint used in this invention is not particularly restricted. It may be an ordinary anionic or a cationic group which is introduced into an electrodeposition paint resin to water-solubilize it or render it water-dispersible. For example, the anionic group may be a carboxyl group, a phosphonic acid group, or a sulfonic acid group, and the cationic group may be a primary, secondary or tertiary amino group, a quaternary ammonium salt group, a quaternary phosphonium salt group, or a tertiary sulfonium salt group. Generally, the anionic group is preferably a carboxyl group, and the cationic group is preferably a primary, secondary or tertiary amino group. The cationic group is especially preferred. These anionic or cationic groups are neutralized with a base or acid to form ionic groups.

The amount of such ionic groups is one sufficient to make the resin water-soluble or water-dispersible, and varies depending, for example, upon the type of the ionic groups. Generally, it is about 0.1 to about 2 milliequivalents per gram of dry resin, preferably about 0.2 to about 1 milliequivalent per gram of dry resin.

The method of introducing the ionic group into the base resin is not particularly restricted, and may be any method known per se. It is desirable to use methods which do not produce by-products that may possibly affect the electrodeposited films adversely. Some of such methods are described below.

Introduction of an anionic group (1) Copolymerization of a carboxyl group-containing vinyl or acrylic monomer.

(2) Esterification between a polycarboxylic acid and a hydroxyl group-containing polymer or a polyepoxide.

(3) Addition of an alpha,beta-unsaturated dicarboxylic acid to the unsaturated bonds of polybutadiene, etc.

Introduction of a cationic group (1) Addition reaction between a primary or secondary amine and a polyepoxide or a poly-alpha,beta-unsaturated carbonyl compound.

(2) Copolymerization of an amino group-containing vinyl or acrylic monomer.

(3) Condensation between a polyamine and a polycarboxylic acid.

(4) Mannich base-forming reaction with a secondary amine, formaldehyde and a phenolic compound.

(5) Addition reaction between a tertiary amino group-containing alcohol and a polyisocyanate.

(6) Addition reaction between an alcohol containing a ketimine group, an oxazolidine group or an imidazoline group and a polyepoxide (see U. K. Pat. No. 2184124A and European Pat. No. 220442A).

Although there is no particular restriction on the base resin into which an ionic group is to be introduced, it may be chosen depending upon end uses. The base resin should contain a hydroxyl group having reactivity with the hydroxysilane group or the alkoxysilane group. If the base resin does not contain a hydroxyl group, hydroxyl groups may be introduced into it by utilizing, for example, the addition-reaction of a 1,2-epoxy compound or an alkylene carbonate with carboxyl groups or primary or secondary amino groups in the resin, or the addition-reaction of a polyol with diisocyanate groups in the resin. The amount of the hydroxyl group is generally about 0.2 to about 10 milliequivalents/gram of dry resin, preferably 0.5 to 5 milliequivalents/gram of dry resin. For use as a primer requiring corrosion resistance, a resin having as a main component a polymer of a polyglycidyl ether of a polyphenol (so-called epoxy resin) is preferred. For use in one-coat paints requiring weatherability, acrylic resins, polyester resins, and alkyd resins, for example, are preferred. Acrylic resins are especially preferred.

The molecular weight of the base resin is not particularly limited. Generally, its number average molecular weight is about 380 to about 100,000.

Typical examples of the epoxy resin are polyglycidyl ethers of polyphenols such as bis(4-hydroxyphenyl)-2,2-propane, bis(4-hydroxyphenyl)-1,1-ethane, bis (4-hydroxyphenyl)-methane, 4,4-dihydroxydiphenylether, 4,4'-dihydroxydiphenylsulfone, phenol novolak, cresol novolak and polymers thereof.

Preferred among them from the viewpoint of price and corrosion resistance are polyglycidyl ethers of polyphenols having a number average molecular weight of at least about 380, preferably about 800 to about 2,000, more preferably 1,000 to 1,500, and an epoxy equivalent of generally 190 to 2,000, preferably 400 to 1,000, more preferably 500 to 750.

Particularly preferred are epoxy resins of the following general formula

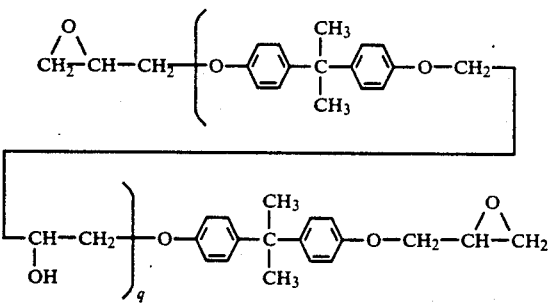

wherein q is 0 to 4.

These epoxy resins may be used singly, or after modification with plastic or elastic modifiers.

Examples of the acrylic resin are polymers or copolymers obtained by (co)polymerizing at least one acrylic monomer and as required, at least one other alpha,beta-ethylenically unsaturated monomer such as styrene, its derivatives (e.g., alpha-methylstyrene), (meth)acrylonitrile, butadiene, selected according to the method of introducing the ionic group described above. The acrylic monomer may include, for example, $C_1$-$C_{12}$ alkyl esters of (meth)acrylic acid such as methyl (meth)acrylate, ethyl (meth)acrylate, butyl (meth)acrylate, propyl (meth)acrylate and 2-ethylhexyl (meth)acrylate; $C_1$-$C_4$ hydroxyalkyl esters of (meth)acrylic acid such as hydroxyethyl (meth)acrylate and hydroxypropyl (meth)acrylate; aminoalkyl esters of (meth)acrylic acid such as aminoethyl (meth)acrylate and N,N-dimethylaminoethyl (meth)acrylate; glycidyl (meth)acrylate; and (meth)acrylic acid.

Suitable acrylic resins have a number average molecular weight of about 3,000 to about 100,000, preferably about 4,000 to about 50,000.

Alkyd resins (or polyesters) known heretofore can be used in this invention. The acid component of the alkyd resins (or polyesters) includes, for example, aromatic polybasic acids such as phthalic acid and its anhydride, isophthalic acid, terephthalic acid, dimethylisophthalic acid, dimethylterephthalic acid, trimellitic acid and its anhydride and pyromellitic acid and its anhydride; saturated alicyclic polybasic acids such as hexahydrophthalic acid and its anhydride, hexahydrotrimellitic acid and its anhydride and hexahydro-2-methyltrimellitic acid and its anhydride; and saturated dibasic acids such as succinic acid and its anhydride, adipic acid, pimelic acid, azelaic acid, sebacic acid and brasyllic acid.

Examples of the alcohol component constituting the alkyd resins (or polyesters include ethylene glycol, diethylene glycol, propylene glycol, neopentyl glycol, 1,2-butylene glycol, 1,3-butylene glycol, 2,3-butylene glycol, 1,4-butylene glycol, 1,6-hexanediol, 1,5-pentanediol, 1,6-hexanediol, 3,5-hexanediol, trimethylolethane, trimethylolpropane, glycerol, pentaerythritol, dipentaerythritol, diglycerol, sorbitol, Ester Diol 204 (a product of Union Carbide Corporation, U.S.A.), tricyclodecane dimethanol and 1,4-cyclohexane dimethanol.

Various natural and synthetic fatty acids and glycerides thereof are used as the modifying oil component.

The alkyd resins (or polyesters) suitably have a number average molecular weight of about 1,000 to about 15,000, preferably about 2,000 to about 10,000.

If the number average molecular weight of the base resin such as the above-mentioned epoxy resin, acrylic resin and alkyd resin is lower than the above-specified limit, the desired film properties are difficult to obtain. If it is higher than the specified limit, the base resin is difficult to disperse in water because of its high viscosity in water.

There is no particular restriction on the crosslinking agent containing at least two alkoxysilane groups and optionally hydroxysilane groups per molecule. Preferably, it has good compatibility with the base resins. Those obtained by the following methods (1) to (7), for example, are preferred. The hydroxysilane group does not necessarily have to be present in the crosslinking agent in advance since it can be easily obtained by hydrolysis of the alkoxysilane group. Furthermore, acetoxysilane, ketoximesilane, aminosilane and aminoxysilane groups can also be used in place of the lower alkoxysilane group because they easily give hydroxysilane groups upon hydrolysis. These groups should thus be understood to be within the concept of the hydroxysilane group in this invention.

(1) Copolymerization of an alkoxysilane group-containing vinyl or acrylic monomer. Examples of the monomer are as follows:

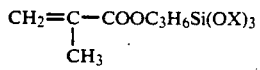

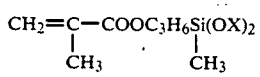

(2) Reaction of an alkoxysilane group-containing amine compound with a polyepoxide, a polycarboxylic acid compound or a polyisocyanate compound. Examples of the amine compound are as follows:

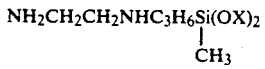

(3) Addition of an alkoxysilane group-containing epoxy compound to a polyamine, a polycarboxylic acid or a polyphenol. Examples of the epoxy compound are as follows:

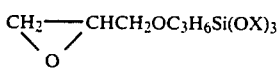

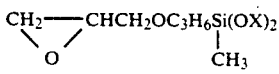

-continued

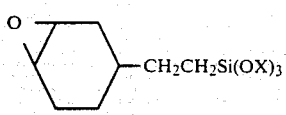

(4) Addition of an alkoxysilane group-containing isocyanate compound to a polyol, or a polyamine. Examples of the isocyanate compound are as follows:

OCNC₃H₆Si(OX)₃

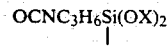

(5) Condensation of a compound or resin intermediate (polyorganosiloxane) containing at least two functional groups selected from hydroxysilane and alkoxysilane groups per molecule with itself or with a polyol. Examples of the compound or resin intermediate are as follows:

Si(OX)₄

CH₃—Si(OX)₃

C₆H₅—Si(OX)₃

(XO)₃—Si—O—Si(OX)₃

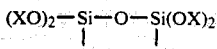

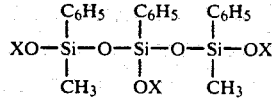

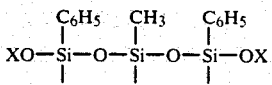

(6) An addition-reaction product of an alkoxysilane group-containing mercaptan with a polyepoxide. Examples of the mercaptan are HSC₃H₆(Si(OX)₃ and HSC₂H₄Si(OX)₃.

(7) Addition condensation-reaction product of an alkoxysilane group-containing urea compound with formaldehyde. An example of the urea compound is H₂NCONHC₃H₆Si(OX)₃.

The organic groups X in the above formulae include, for example, (i) alcohol residues such as —CH₃, —C₂H₅, —C₃H₇, —C₄H₉, —C₆H₁₃ and —C₈H₁₇, (ii) ether alcohol residues such as —C₂H₄OCH₃, —C₂H₄OC₂H₅, —C₂H₄OC₃H₇, —C₂H₄OC₄H₉, —C₃H₆OCH₃—, —CH₃H₆OC₂H₅, —C₄H₈OCH₃, —C₂H₄OC₂H₄OCH₃, —C₂H₄OC₂H₄OC₂H₅, and —C₂H₄OC₂H₄OC₄H₉, (iii) ester alcohol residues such as

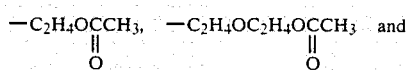

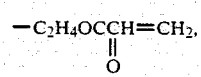

and (iv) cycloalkyl, aralkyl or heterocyclic-alkyl alcohol residues such as

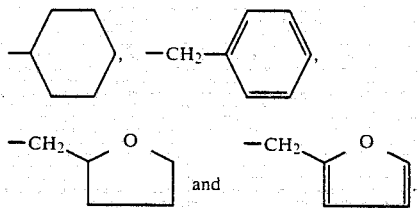

X has higher reactivity and better low-temperature curability with smaller number of carbon atoms therein. But X with less carbon atoms tend more to be condensed after hydrolysis and stability in an aqueous system is lower. The number of carbon atoms is advantageously 2 to 7, preferably 2 to 4, in view of balance. Alternatively, balance may be obtained by combining with those having less than 2 carbon atoms or more than 7 carbon atoms. Especially preferred alcohols are n- or iso-propanol and n-, iso- or sec-butanol.

The amount of the alkoxysilane group and optionally, hydroxysilane group in the crosslinking agent is one required to give a cured film having a sufficient crosslinking density by baking of the electrodeposited film. It is generally about 0.2 to 20 milliequivalents/gram of the vehicle component (solid), particularly 0.5 to 5 milliequivalents/gram of vehicle component.

When the amount of the functional group selected from hydroxysilane and alkoxysilane groups is small, the curability of the coated film becomes poor. If it is larger than the specified limit, the cured film tends to be hard and brittle. It is of course possible to use a crosslinking agent containing an N-methylol group or a low temperature dissociable blocked isocyanate group together with the crosslinking agent containing alkoxysilane groups and optionally, hydroxysilane groups. The curability may be improved by introducing the N-methylol group or the low-temperature dissociable blocked isocyanate group into the base resin. In particular, the joint use of oxime-blocked polyisocyanates is effective.

Electrodeposition coating may be carried out by conventional methods from an aqueous dispersion of the base resin containing both an ionic group and a hydroxyl group and the crosslinking agent containing alkoxysilane groups and optionally, hydroxysilane groups.

Specifically, a pigment, a solvent, a surface-active agent, etc. are added as required to the above aqueous dispersion, and the mixture is diluted with water to a solids content of generally about 5 to 25% by weight. An electrode and a conductive article to be coated are immersed in the resulting aqueous electrodeposition coating bath. By passing current through the bath, an electrodeposited film is obtained on the article to be coated. Electrodeposition may generally be carried out at a voltage of 50 to 500 V for a period of 30 seconds to 5 minutes.

After an electrodeposited film of a required thickness is obtained, the article is dried by a suitable method in a baking oven or an infrared heater, for example, at a temperature of 80° to 150° C., preferably 100° to 140° C., after optionally washing it with water. As a result, the electrodeposited film is heat-melted and can be changed to a smooth uniform cured film. The article to be coated may be any conductive substrate, but the method of this invention is especially suitable for electrodeposition coating of metallic substrates such as steel, aluminum and copper.

The water-base paint resin composition of this invention is most suitable for electrodeposition coating as stated above, but can also be applied to dip coating, flow coating, roller coating, etc.

The following Examples illustrate the present invention more specifically. It should be understood, however, that the invention is not limited to these specific examples.

EXAMPLE 1

A base resin was produced in accordance with the following recipe.

| Material | Parts by weight |
| --- | --- |
| Glyci-ale BPP-350 (*1) | 350 |
| bisphenol A | 228 |
| diethanolamine | 10.5 |
| Epon 828EL (*2) | 380 |
| ethylene glycol monobutyl ether | 105 |
| acetylacetone | 210 |
| diethanolamine | 84 |

(*1) Diglycidyl ether of a propylene oxide adduct of bisphenol A having an epoxy equivalent of about 350 (a product of Sanyo Chemical Co., Ltd.).
(*2) Diglycidyl ether of bisphenol A having an epoxy equivalent of about 190 (a product of Yuka Shell Co., Ltd.).

Glyci-ale BPP-350, bisphenol A and diethanolamine were heated to 150° C. and reacted until the epoxy equivalent (*3) of the reaction mixture reached at least 3,000. Epon 828EL was added, and the entire mixture was further reacted until the epoxy equivalent of the reaction mixture reached the theoretical value (970). The reaction mixture was diluted with ethylene glycol monobutyl ether and acetylacetone, and cooled to 80° C. Diethanolamine was added, and reacted until the tertiary amine value (*4) of the reaction mixture reached the theoretical value (52).

(*3): Measured in accordance with JIS K-7236, provided that the amino groups were also calculated as epoxy groups.

(*4): The sample was acetylated with acetic anhydride, and then titrated with perchloric acid using Crystal Violet as an indicator.

A crosslinking agent was produced in accordance with the following recipe.

| Material | Parts by weight |
| --- | --- |
| gamma-isocyanatopropyl-monoethyldiethoxysilane | 609 |
| Placcel 303 (*5) | 315 |
| methyl ethyl ketone | 46 |

(*5): Caprolactone/triol adduct having a hydroxyl equivalent of about 105 (a product of Dicell Co., Ltd.).

The gamma-isocyanatopropylmonomethyldiethoxysilane and Placcel 303 were heated to 110° C., and reacted until no isocyanate group was detected by IR analysis. Methyl ethyl ketone was added to the reaction mixture, and the solution was cooled.

The base resin (101 parts; solids content 77.5 parts), 23.6 parts (solids content 22.5 parts) of the crosslinking agent and 1.0 part of lead acetate were well mixed, and 2.4 parts of acetic acid was added to neutralize the mixture. With stirring, deionized water was added to disperse the neutralization product in water and to obtain an electrodeposition bath having a solids content of 15%. A zinc phosphate treated steel panel was coated from the resulting electrodeposition bath at a bath temperature of 22° C. and a voltage of 200 V for 3 minutes, and baked at 120° C. for 30 minutes. A smooth, acetone-resistant film having a thickness of about 25 microns was obtained. It showed an outstanding Du Pont impact strength (½ inch, 500 g load, 50 cm, acceptable at both surfaces) and salt spray resistance (1000 hours, acceptable).

EXAMPLE 2

A crosslinking agent was produced in accordance with the following recipe.

| Material | Parts by weight |
| --- | --- |
| gamma-Glycidoxypropyl-trimethoxysilane | 410 |
| benzyl alcohol | 451 |
| Iron (III) acetylacetonate | 0.008 |
| bisphenol A | 228 |
| triphenylphosphonium iodide | 0.094 |

The gamma-glycidoxypropyltrimethoxysilane, benzyl alcohol and iron (III) acetylacetonate were heated to 120° C., and then reacted at 160 until the evaporation of methanol ceased. Then, bisphenol A and triphenylphosphonium iodide were added, and the reaction was carried out at the above temperature until the epoxy equivalent of the reaction mixture reached at least 4700. The reaction product was cooled to obtain a crosslinking agent having a solids content of 98%.

The base resin obtained in Example 1 (91 parts; solids content 70 parts), 30.5 parts (solids content 30 parts) of the crosslinking agent and 1 part of titanium oxyacetylacetonate were mixed. Using the resulting electrodeposition bath, the same coating test as in Example 1 was carried out and the coating was baked at 140° C. for 30 minutes to give a similar coated film.

EXAMPLE 3

A crosslinking agent was produced in accordance with the following recipe.

| Material | Parts by weight |
| --- | --- |
| gamma-aminopropyltri-butoxysilane | 578 |

| Material | Parts by weight |
| --- | --- |
| propylene carbonate | 204 |
| toluene diisocyanate (2,4-/2,6 = 80/20) | 174 |
| methyl ethyl ketone | 47.8 |

Propylene carbonate was added dropwise to gamma-aminopropyltributoxysilane at 60° C., and they were reacted until the amine value of the product decreased to below 1. Then, toluene diisocyanate was added, and at 100° C., the reaction was carried out until no isocyanate group was detected. Methyl ethyl ketone was added to the reaction mixture, and the solution was cooled.

The base resin obtained in Example 1 (91 parts; solids content 70 parts), 31.5 parts (solids content 30 parts) of the crosslinking agent and 1 part of lead 2-ethylhexanoate were well mixed, and the same coating test as in Example 1 was carried out. The coating was baked at 140° C. for 30 minutes to give a similar coated film.

EXAMPLE 4

A base resin was produced in accordance with the following recipe.

| Material | Parts by weight |
| --- | --- |
| isopropanol | 400 |
| styrene | 350 |
| n-butyl acrylate | 300 |
| hydroxyethyl acrylate | 200 |
| dimethylaminoethyl methacrylate | 150 |
| azobisisobutyronitrile | 3 |
| isopropanol | 50 |
| azobisdimethylvaleronitrile | 1 |

A mixture of styrene, n-butyl acrylate, hydroxyethyl acrylate, dimethylaminoethyl methacrylate and azobisisobutyronitrile was added dropwise to isopropanol at 85° C. over about 3 hours. The mixture was then aged for about 1 hour. A solution of azobisdimethylvaleronitrile in isopropanol was added dropwise over the course of about 1 hour, and then the mixture was aged for 2 hours.

This resin solution (145 parts; solids content parts), 21 parts (solids content 20 parts) of the crosslinking agent and 1 part of lead acetate were mixed, and 3.2 parts of acetic acid was added to neutralize the resin. Deionized water was added to dissolve the mixture in water and obtain an electrodeposition bath having a solids content of 15%. A zinc phosphate-treated steel panel was coated from the resulting electrodeposition bath at a bath temperature of 20° C. and a voltage of 150 V, and then baked at 140° C. for 20 minutes. A smooth lustrous coated film having a thickness of about 20 microns was obtained. It showed good acetone rubbing resistance (20 reciprocations, no hange) and Du Pont impact strength (½ inch, 500 g load, 50 cm, acceptable at both surfaces).

What is claimed is:

1. A method of cationic electrodeposition coating which comprises electrodepositing a water-base electrodeposition coating composition comprising a cationic group-containing resin selected from the group consisting of epoxy resins, acrylic resins and alkyd resins, and a external crosslinking agent as vehicles on an article to be coated and then heating the coated article to form a cured coating film, wherein the cationic group-containing resin contains a hydroxy group and the crosslinking agent contains at least two alkoxysilane groups per molecule, and said resin can be cured by a condensation reaction between said alkoxysilane groups and the hydroxyl groups.

2. The method of claim 1 wherein the cationic group of the cationic group-containing resin is an amino group neutralized with an acid.

3. The method of claim 1 wherein a resin containing a hydroxyl group is used as as base resin for the cationic group-containing resin.

4. The method of claim 3 wherein the base resin contains the hydroxyl group in an amount of 0.2 to 10 milliequivalents/gram of dry resin.

5. The method of claim 1 wherein the amount of the cationic group is 0.1 to 2 milliequivalents/gram of dry resin.

6. the method of claim 1 wherein the amounts of the alkoxysilane groups in the crosslinking agent is 0.2 to 20 milliequivalents/grams of said resin and crosslinking agent vehicle components as calculated in the solid state.

7. The method of claim 1 wherein the water-base electrodeposition coating composition contains acetylacetone.

8. An article coated by the method of claim 1.

9. A water-based coating composition comprising as film-forming vehicles a resin selected from the group consisting of epoxy resins, acrylic resins and alkyd resins and containing both a cationic group and a hydroxyl group and a crosslinking agent containing at least two alkoxysilane groups per molecule.

10. The coating composition of claim 9 wherein the ionic group of the cationic group-containing resin is an amino group neutralized with an acid.

11. The coating composition of claim 9 wherein a resin containing a hydroxy group is used as a base resin for the cationic group-containing resin.

12. The coating composition of claim 1 wherein the base resin contains the hydroxyl group in an amount of 0.2 to 10 milliequivalents/gram of dry resin.

13. The coating composition of claim 9 wherein the amount of the cationic group is 0.1 to 2 milliequivalents/gram of dry resin.

14. The coating composition of claim 9 wherein the amounts of the functional groups in the crosslinking agent is 0.2 to 20 milliequivalents/gram of said resin and crosslinking vehicle components as calculated in the solid state.

* * * * *